(12) United States Patent
Kleinhout et al.

(10) Patent No.: US 10,042,523 B2
(45) Date of Patent: *Aug. 7, 2018

(54) CLASSIFYING AND ORGANIZING WEB RESOURCES IN WEB BROWSERS

(71) Applicant: OPERA SOFTWARE AS, Oslo (NO)

(72) Inventors: Huib Kleinhout, Hagan (NO); Anders Hartvoll Ruud, Oslo (NO); Daniel Lazarenko, Oslo (NO); Alexander Remen, Oslo (NO); Carsten Zeiffert, Oslo (NO); Terje Stoback, Oslo (NO); Rik van den Munckhof, Oslo (NO)

(73) Assignee: OPERA SOFTWARE AS, Oslo (NO)

( * ) Notice: Subject to any disclaimer, the term of this patent is extended or adjusted under 35 U.S.C. 154(b) by 471 days.

This patent is subject to a terminal disclaimer.

(21) Appl. No.: 14/481,480

(22) Filed: Sep. 9, 2014

(65) Prior Publication Data

US 2015/0095847 A1    Apr. 2, 2015

Related U.S. Application Data

(60) Provisional application No. 61/876,192, filed on Sep. 10, 2013.

(51) Int. Cl.
| | |
|---|---|
| *G06F 3/0484* | (2013.01) |
| *G06F 17/30* | (2006.01) |
| *G06F 3/0483* | (2013.01) |
| *G06F 3/0482* | (2013.01) |
| *G06F 3/0486* | (2013.01) |

(52) U.S. Cl.
CPC .......... *G06F 3/0484* (2013.01); *G06F 3/0482* (2013.01); *G06F 3/0483* (2013.01); *G06F 3/0486* (2013.01); *G06F 17/30861* (2013.01); *G06F 17/30873* (2013.01); *G06F 17/30876* (2013.01)

(58) Field of Classification Search
CPC ............. G06F 17/30861; G06F 3/0482; G06F 3/0483; G06F 17/30876; G06F 17/30873; G06F 3/0484; G06F 3/0486
USPC .................................................. 715/835, 783
See application file for complete search history.

(56) References Cited

U.S. PATENT DOCUMENTS

| | | | | |
|---|---|---|---|---|
| 5,995,103 A | * | 11/1999 | Ashe .................. | G09G 5/14 715/804 |
| 6,456,307 B1 | * | 9/2002 | Bates ................ | G06F 3/0481 715/779 |
| 8,191,007 B1 | * | 5/2012 | Veloz, III .......... | G06F 17/30899 715/764 |
| 8,245,154 B2 | * | 8/2012 | Karstens ............... | G06F 9/4443 715/783 |
| 8,631,341 B2 | * | 1/2014 | Sauve .................. | G06F 3/0481 715/776 |
| 9,043,464 B1 | * | 5/2015 | Trainor ................. | H04W 48/18 709/221 |

(Continued)

*Primary Examiner* — Nicholas Ulrich
(74) *Attorney, Agent, or Firm* — Birch, Stewart, Kolasch & Birch, LLP

(57) ABSTRACT

New ways of presenting information in a web browser are provided in which documents categorized as belonging to the same web site or application are grouped together and presented in either an first mode where a browser window is open and one of the resources categorized as belonging to the group is displayed, or in a second mode where the group is represented by an icon.

13 Claims, 9 Drawing Sheets

(56) References Cited

U.S. PATENT DOCUMENTS

| | | | |
|---|---|---|---|
| 2003/0095139 A1* | 5/2003 | Davidsson | G06F 17/3071 715/700 |
| 2004/0085328 A1* | 5/2004 | Maruyama | G06F 3/0481 345/619 |
| 2005/0234940 A1* | 10/2005 | Apparao | G06F 17/30884 |
| 2006/0224997 A1* | 10/2006 | Wong | G06F 17/30884 715/838 |
| 2007/0016543 A1* | 1/2007 | Epling | G06F 9/4443 |
| 2008/0005686 A1* | 1/2008 | Singh | G06F 3/04842 715/764 |
| 2008/0184158 A1* | 7/2008 | Selig | G06F 17/243 715/781 |
| 2010/0070928 A1* | 3/2010 | Goodger | G06F 17/30905 715/838 |
| 2011/0131523 A1* | 6/2011 | Grant | G06F 3/0481 715/777 |
| 2011/0271224 A1* | 11/2011 | Cruz Moreno | G06F 3/0483 715/777 |
| 2012/0054669 A1* | 3/2012 | Refuah | G06F 17/30864 715/783 |
| 2012/0131495 A1* | 5/2012 | Goossens | G06F 3/0482 715/782 |
| 2013/0219343 A1* | 8/2013 | Nan | G06F 3/0486 715/838 |
| 2014/0250390 A1* | 9/2014 | Holmes | G06F 9/4443 715/760 |

\* cited by examiner

CLASSIFYING AND ORGANIZING WEB RESOURCES IN WEB BROWSERS

CROSS-REFERENCE TO RELATED APPLICATION

The present application claims domestic priority under 35 U.S.C. 119(e) to U.S. Provisional Application No. 61/876,192 filed on Sep. 10, 2013, the entire contents of which are herein incorporated by reference in their entirety.

FIELD OF THE INVENTION

The invention relates to web browsers and similar software applications that are able to retrieve and display content from websites or other resources accessible over a computer network. In particular the invention relates to methods, devices and computer program products for accessing, maintaining and displaying information obtained from a data resource.

BACKGROUND OF THE INVENTION

The first web browsers included a window for displaying the contents of a web document framed by an area with user interface controls for, e.g., back and forward navigation, reloading and returning to a defined "home page," opening locally stored files, entering a web address or uniform resource locator (URL), and printing a document. Over the years some additional functionality has been added; the most important development has probably been the introduction of tabbed browsing, which introduced the ability to open several documents inside one browser window and use tabs for switching between documents.

An advantage with tabs is that a user can quickly switch between web documents without having to navigate or reload information. Furthermore, state information (such as scroll position and text entered in forms) is maintained in each tab and not lost when the user switches to a different tab.

However, the traditional user interface controls described above are rigid and do not give web applications full control over the user interface. For instance, many web applications can give unexpected or inefficient results when using back navigation. Particularly, if the page navigated back to was one that automatically forwarded the browser to the page the user attempted to navigate back from, the browser will go back and forth between the same two pages each time the user clicks on the "back" button. As a result of this, many "native" applications, particularly on mobile platforms such as the Android™ operating system provided by Google and the iOS operating system provided by Apple, are simply web applications presented through a web browser without user interface controls (a so-called "chromeless" browser).

There are also disadvantages with the browser tabs. They are manually created and deleted by users. Because managing them requires time and an effort, they are typically not used effectively. It is common for users to have several tabs open of the same page, leading to confusion and wasted computer resources. Also, users tend to accumulate more and more tabs over time because they do not want to close potentially important documents; and the more tabs that are added, the more time it takes to find a particular tab. The situation is often made even worse by the fact that browsers show tabs and webpages simultaneously in a limited amount of screen space.

Browser developers have tried to compensate for these limitations in various ways. Some browsers include a visual overview of the tabs, where users can manually switch to a view providing, for example, thumbnail presentations of the content in each tab. Other browsers close all tabs when the browser is closed, and start with only one tab when the browser is restarted, causing information to be lost between browsing sessions. Certain browser extensions also exist, for example, to find tabs with duplicate content.

The situation, however, is still one where users must manually maintain information if they want to keep it and not lose control, or they must accept the loss of information between browsing sessions. The situation clearly is one where improvement is needed.

SUMMARY OF THE INVENTION

The present invention, in its various aspects, addresses these shortcomings and provides solutions that at least help mitigate them and provide users with alternative ways of managing, accessing and viewing information.

In a first aspect of the invention, methods, devices and computer program products are provided in which a web browser presents information by automatically detecting characterizing features that are part of data received from a resource such as a webpage. Based on the characterizing features, the browser groups data resources and effectively treats the resources of each group as belonging to one application. The different resources or web pages that are treated as belonging to the same application are represented as different states of that application, and the different applications (groups of data resources) can be presented as icons, tabs or thumbnails in an overview of applications. The browser may be configured to classify and maintain data automatically without requiring an effort from the user.

In a second aspect of the invention, methods, devices and computer program products are provided where a browser is configured to toggle between the following two modes: a first mode in which a browser window is open to display content provided by a resource; and a second mode in which a minimized representation of a group of resources are presented for example as an icon or a tile.

In a third aspect of the invention, methods, devices and computer program products are provided for classifying resources (such as webpages) as belonging to an existing group of resources if certain requirements associated with that group are fulfilled, and to create a new group and new requirements if no existing requirements are fulfilled. Group membership and requirements may be dynamically updated in this aspect.

In a fourth aspect of the invention, documents loaded into a web browser are maintained automatically in order to maintain document information and state information over time based on an estimated importance of the document.

In a fifth aspect of the invention, a user interface is provided where minimized representations of groups of resources can be manipulated by user input in a manner that allows a user to invoke methods on the group of resources in a consistent manner no matter in which context the resource is represented.

In a sixth aspect, a user interface presents a stack of icons or other representations of groups of resources. The user can drag the stack in on direction in order to manipulate the group of resources represented by the topmost icon, and in a second direction in order to spread out and display all the icons in the stack. Furthermore, the user may drag and drop icons in order to invoke specific methods represented by the position at which the icon is dropped.

In a seventh aspect, a user can enter a search string and receive search results which are minimized representations of groups of resources.

DETAILED DESCRIPTION

Figure 1:
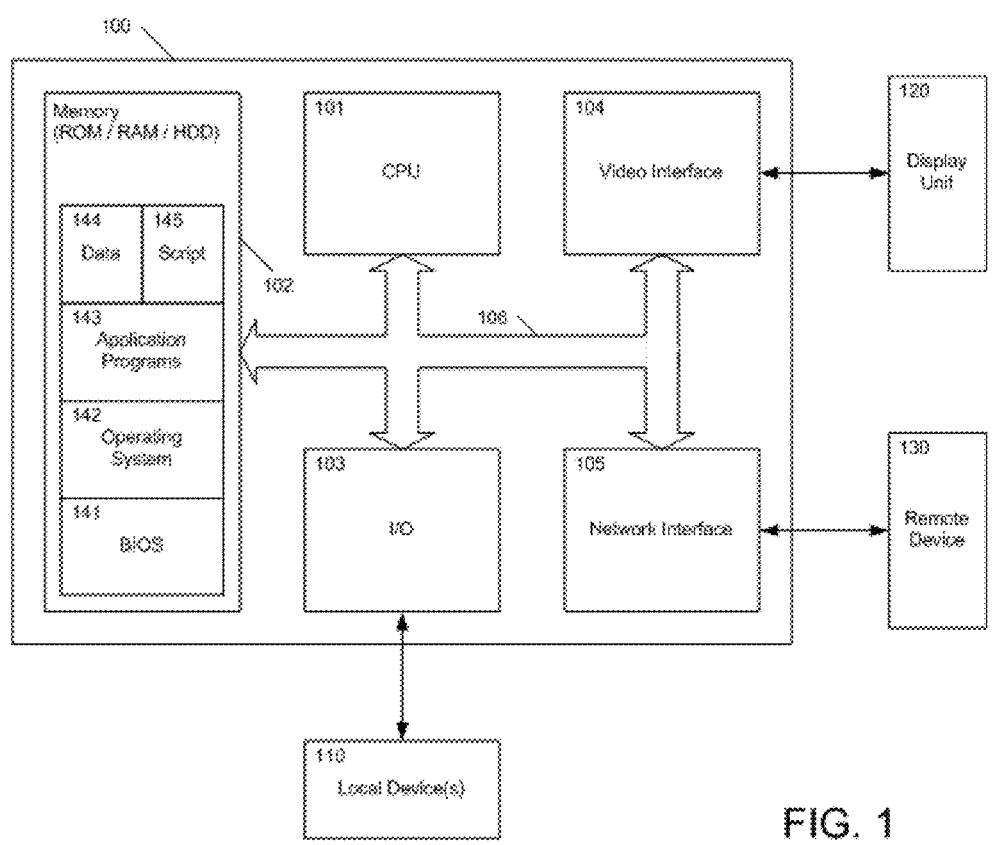
FIG. 1 illustrates a generalized computer system that can be used as an environment for implementing various aspects of the present invention.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The invention relates to the management and presentation of information in browsers, particularly, to the organization and presentation of information in a manner that is more analogous to the way applications are handled by operating systems and window managers, than the way websites and webpages have traditionally been handled by web browsers.

Within the specified paradigm, websites have two main states: minimized and opened. In an opened state, the website may be presented in full screen mode, contrary to regular browsers which always show some UI controls, although the invention may also be implemented on browsers where at least some chrome accompanies a website in its open state.

In minimized state the websites are represented as a list or grid of applications with icons, screen shots and/or website names. However, certain aspects of the invention may also be combined with the traditional tab representations of minimized web sites.

When switching from a minimized state to an opened state, the application may be restored in the "most relevant state." The most relevant state may be the latest accessed document on the website, the most frequently accessed page on the site, or the start page of the website. By default the start page may, for example, be assumed to be the domain name without path. However, since a domain may host several different web sites, something that typically is the case for blog hosting sites for example, it may be better to use the shortest known path. More sophisticated approaches for finding the root node of a web site may be contemplated.

In the minimized state, the application can show notifications about updates of the website. These updates can be based on new RSS feed items on the provided feeds, notifications as specified in the HTML5 standard, and/or changes in the start page.

In the following description of various exemplary implementations of the various aspects of the invention, certain terms and phrases will be used consistently. As such, a "resource" is generally understood as any concept that can be given an identity which can be expressed by a well formed URI (Uniform Resource Identifier), even abstract concepts or resources that are not retrievable by a computer (e.g., a person). The invention, however, is primarily concerned with retrievable resources. Such resources will be referred to as "retrievable resources," "resources that can be accessed by a computer," or similar terminology. If the term "resources" is used alone, it is still intended to refer to concepts that are in some sense present in a computer network, and some aspect of which must be accessible or retrievable by a computer and capable of being represented or displayed by a web browser. Such resources are usually, but not exclusively, of the type that can be identified by a URL (Uniform Resource Locator). A resource may, however, be one that primarily receives data (such as a printer), but even such a resource will provide some data in response and, thus, can be thought of as a resource from which data can be retrieved without loss of generality. Also, no attempt will be made to distinguish between the resource itself and data retrieved from the resource. For the purposes of this disclosure, data retrieved from the resource can be thought of as an aspect of the resource, and displaying a resource and displaying data retrieved from a resource should be understood as synonymous.

The term "web browser" is intended to refer to any software application or software/hardware combination that can act as a user agent, retrieve resources using communication protocols and display a representation or rendering of the data that has been retrieved. The term "browser window" will primarily refer to the actual display window, i.e., the area in which content is displayed. Unless otherwise noted, the term "browser window" is not intended to refer to the window object handled by a window manager. A "minimized browser window" will refer to a representation in the form of an icon or some other invokable symbol displayed by a device and which opens into an open browser window when invoked.

The term "website" will be used loosely to refer to resources that are associated with each other either for residing on the same server, being related to the same topic and created by the same author or entity or being part of the same domain. A website does not need to have a strict definition. It will be understood that a web browser operating in accordance with the principles of the present invention will, according to some of the inventive aspects, determine whether or not to treat a particular resource (for example a webpage) as part of a website.

According to certain aspects of the invention, websites are treated as applications or web applications. The term application in this context is intended to describe a way of presenting the website (or some other group of related resources), and not as a way of describing the functionality of the resources in terms of any embedded or associated (e.g. residing on a related server) interactivity, script or other capability. However, none of the aforementioned functionality is excluded from being part of an application when the term is used in this sense.

FIG. 1 illustrates a generalized computer system 100 that can be used as an environment for implementing various aspects of the present invention. According to exemplary embodiments, it is contemplated that the computer system 100 may be implemented as any of various types of general purpose computers including, but not limited to, servers, desktop computers, laptop computers, distributive computing systems and any other types of computing devices and systems as will be contemplated by those of ordinary skill in the art. However, certain aspects of the invention are believed to be particularly useful in smart phones, tablets and other devices with touch screen user interfaces, but are in no way limited to such devices.

In FIG. 1, computer system 100 has various functional components including a central processor unit (CPU) 101, memory 102, communication port(s) 103, a video interface 104, and a network interface 105. These components may be in communication with each other by way of a system bus 106.

The memory 102, which may include ROM, RAM, flash memory, hard drives, or any other combination of fixed and removable memory, stores the various software components of the system. The software components in the memory 102 may include a basic input/output system (BIOS) 141, an operating system 142, various computer programs 143 including applications and device drivers, various types of data 144, and other executable files or instructions such as macros and scripts 145.

A communication port 103 may be connected to a mouse device 110. Other communication ports may be provided and connected to other local devices 140, such as additional user input devices, a printer, a media player, external memory devices and special purpose devices such as, e.g., a global positioning system receiver (GPS). Communication ports 103, which may also be referred to as input/output ports (I/O), may be any combination of such ports as USB, PS/2, RS-232, infra red (IR), Bluetooth, printer ports, or any other standardized or dedicated communication interface for the mouse 110 and any other local devices 140.

The video interface device 104 is connected to a display unit 120. The display unit 120 might be an integrated display. For instance, if the computer system 100 is implemented in a portable device, such as a laptop or "netbook" computer, the display will generally be an integrated display such as an LCD display. However, the display unit 120 does not have to be integrated with the other elements of the computer system 100, and can instead be implemented as a separate device, e.g., a standalone monitor.

The network interface device 105 provides the computer system 100 with the ability to connect to a network in order to communicate with a remote device 130. The communication network, which in FIG. 1 is only illustrated as the line connecting the network interface 105 with the remote device 130, may be, e.g., a local area network or the Internet. The remote device 130 may in principle be any computing device or system with similar communications capabilities as the system 100, such as a server or some other unit providing a networked service.

It will be understood that the computer system 100 illustrated in FIG. 1 is not limited to any particular configuration or embodiment regarding its size, resources, or physical implementation of components. For example, more than one of the functional components illustrated in FIG. 1 may be combined into a single integrated unit of the system 100. Also, a single functional component of FIG. 1 may be distributed over several physical units. Other units or capabilities may of course also be present.

Figure 2:
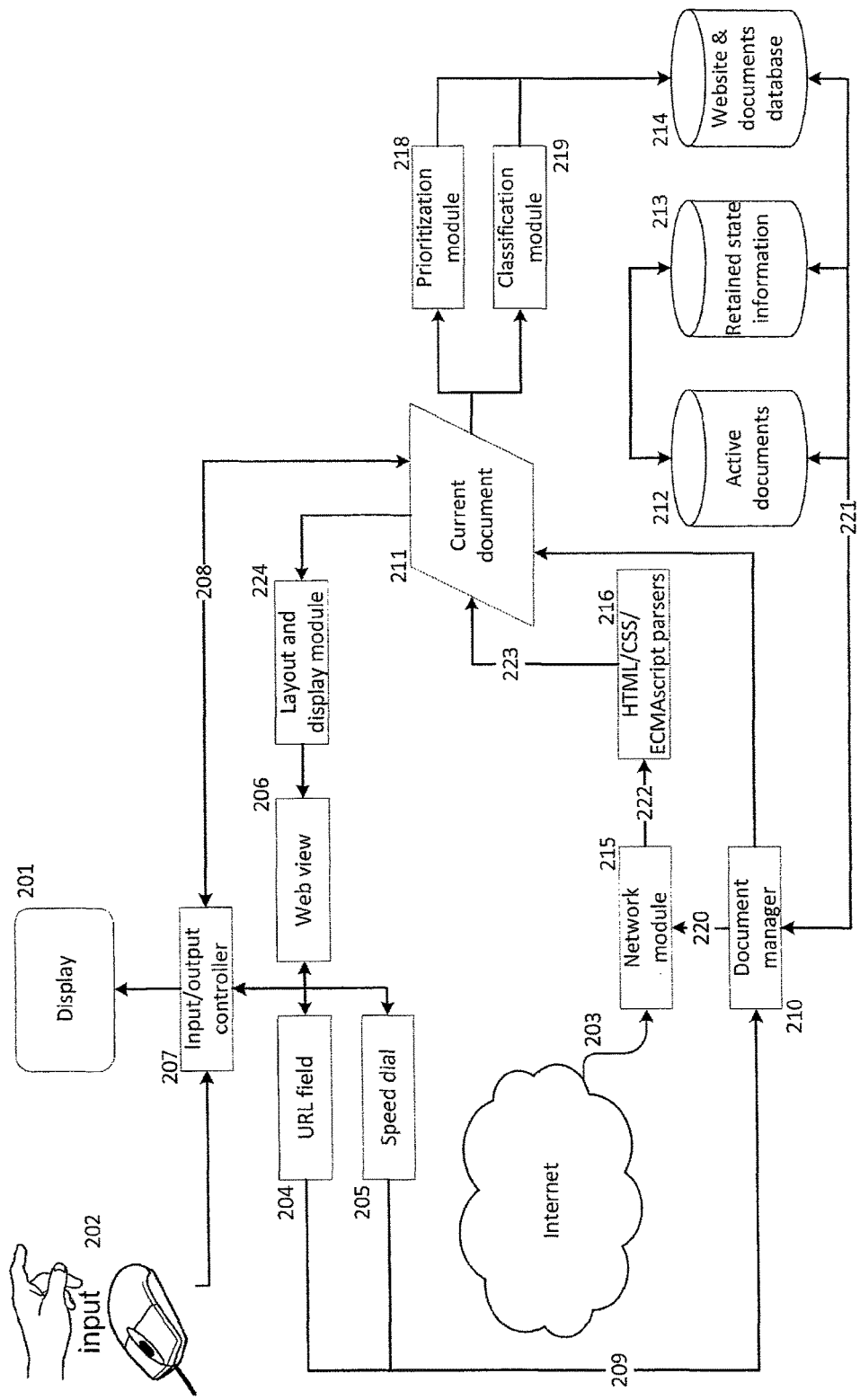
FIG. 2 illustrates a representation of a device operating in accordance with principles of an exemplary embodiment of the present invention in terms of hardware/software modules, functionality and data transfer.

Reference is now made to FIG. 2, which illustrates an exemplary embodiment of a device operating in accordance with principles of the present invention. It will be understood by those with skill in the art that the illustration in FIG. 2 represents a combination of hardware modules, software modules, functionality and data transfer. Whether a particular feature is implemented in hardware, software, or a combination thereof may in some cases be a matter of design choice; in other cases, it will be evident to the skilled artisan how the feature must be implemented. For the purposes of the following explanation, it will not be necessary to distinguish between these.

The device of FIG. 2 includes a graphical display 201 and an input device such as a touch screen, mouse, pen 202 and network connection using for instance 2/3/4G cellular network communication, wired or wireless.

On the device display 201, a graphical user interface may be displayed. The graphical user interface may include a URL field 204, in which the user can enter text using a user interface text input control. In the URL field 204, the user can typically specify locations of new documents to be loaded by typing URL's, search queries or selecting one of the suggested URL's/search queries that are predicted based on partially-entered input. Alternatively, or in addition to the URL field 204, a visual representation 205 of inactive websites or webpages may be presented (illustrated as a "speed dial" interface in FIG. 2). According to one aspect of the invention, these representations 205 will represent web applications or applications, as will be described in further detail below.

A user interface control 206 is configured to display a document loaded from the Internet on the display 201. The user can interact with the document as long as it is rendered on the display 201, primarily through the input device 202.

An input/output controller 207 may regulate user input (such as clicks or touches), and also regulate output, for example, through the rendering of controls 204 and 205 and web documents 206 such that they are displayed based on predictable user-interface interaction sequences and are able to receive user input when needed.

User input events can cause a change in state of the displayed document. This state information is communicated (as illustrated by data transfer 208) between the input/output controller 207 and a representation of the current document 211 in memory.

Users can provide input 202 to one of the controls 204 and 205 to initiate requests for presenting a particular document. Such a request is communicated (as illustrated in data transfer 209) to a document manager 210, which manages the currently displayed document 211. The document manager may also manage a list of active documents stored in memory 212, and have access to a database 213 containing state information about documents, as well as a database 214 containing information about relations between documents and websites/applications.

When the user requests a new document, or when a new document (or some other retrievable resource) is requested as a result of code in a document that is already loaded, the document manager 210 will query the database of active documents 212 in order to determine if the document is already available locally. If the document is available, it will become the current document 211 and be displayed in the webview 206. If the document needs to be loaded or reloaded because it is not stored in memory 212, or because it has expired, the document manager 210 performs a new request using a network module 215 which handles communication over the Internet 203.

If the operating system or the web browser itself determines that it becomes necessary to reduce the amount of resources used by the web browser, the document manager 210 will remove one or more active documents from memory 212. The documents that are being removed may be chosen based on information about the documents stored in memory 214. Before removing a document from memory, important state information may be stored in memory 213.

The network module 215 sends and receives data 222 for new document requests, and performs network activity for active documents 212. When new data is loaded by the network module 215 the HTML/CSS/ECMAscript parsers 216 parse and analyze the data so that it can be displayed or run in the related document, which can be the active document 211 or any one of the documents in memory 212. When a document has completed loading sufficiently, the document manager 210 may recover retained state information such as form data from a database 213. The structure element in a HTML document can be calculated and rendered by the layout and display module 224 so that it can be displayed in a user interface control 206.

Whenever the user interacts with a document (as communicated in 208) or when new data 222, 223 arrives, the state of the document changes. Information about document changes may be sent to a prioritization module 218 and a classification module 219. In accordance with some aspects of the invention, the prioritization module 218 may determine a relative priority for the current document 211, and the classification module 219 may determine to which application the document belongs. This information may then be stored in memory 214 and used by the document manager 210 when restoring documents 221.

Figure 3A:
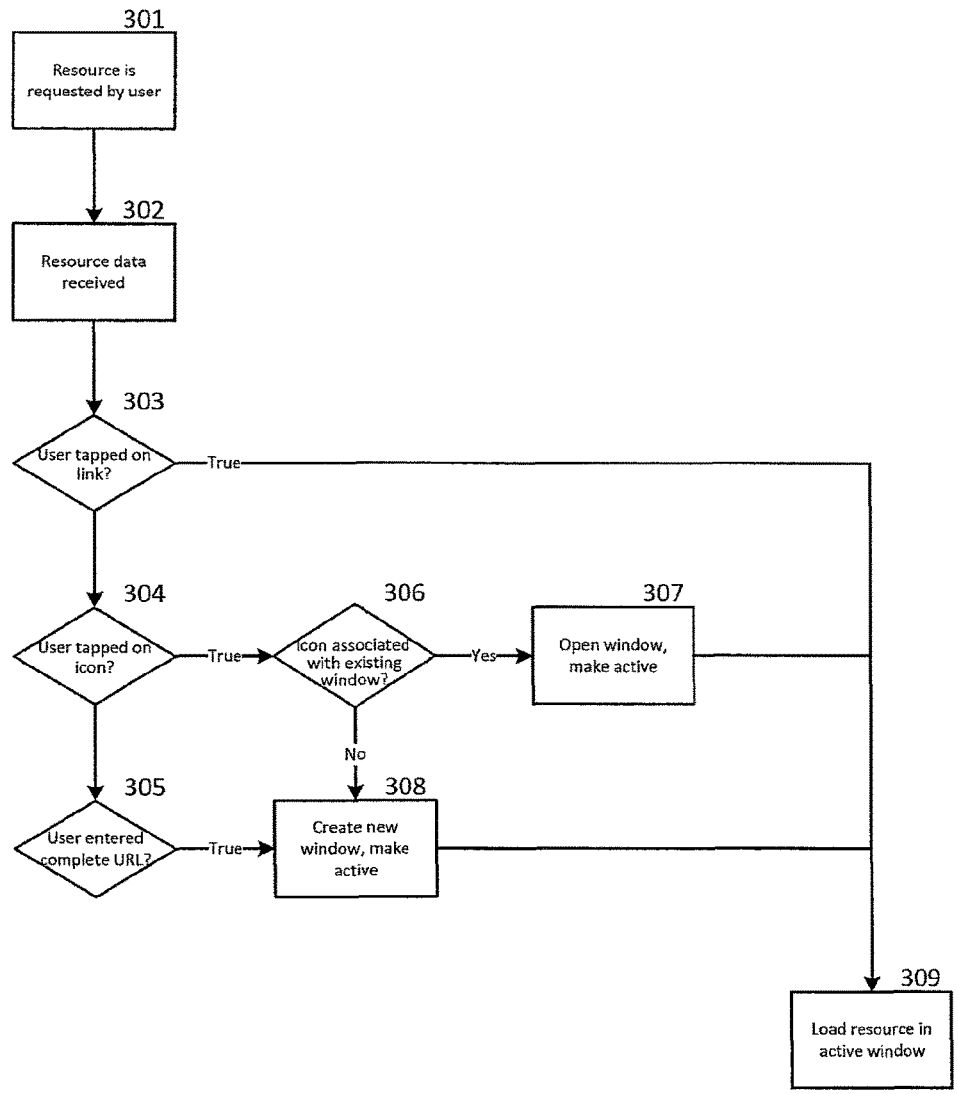
FIG. 3a is a flow chart illustrating a process according to an exemplary embodiment of the present invention.
Figure 3B:
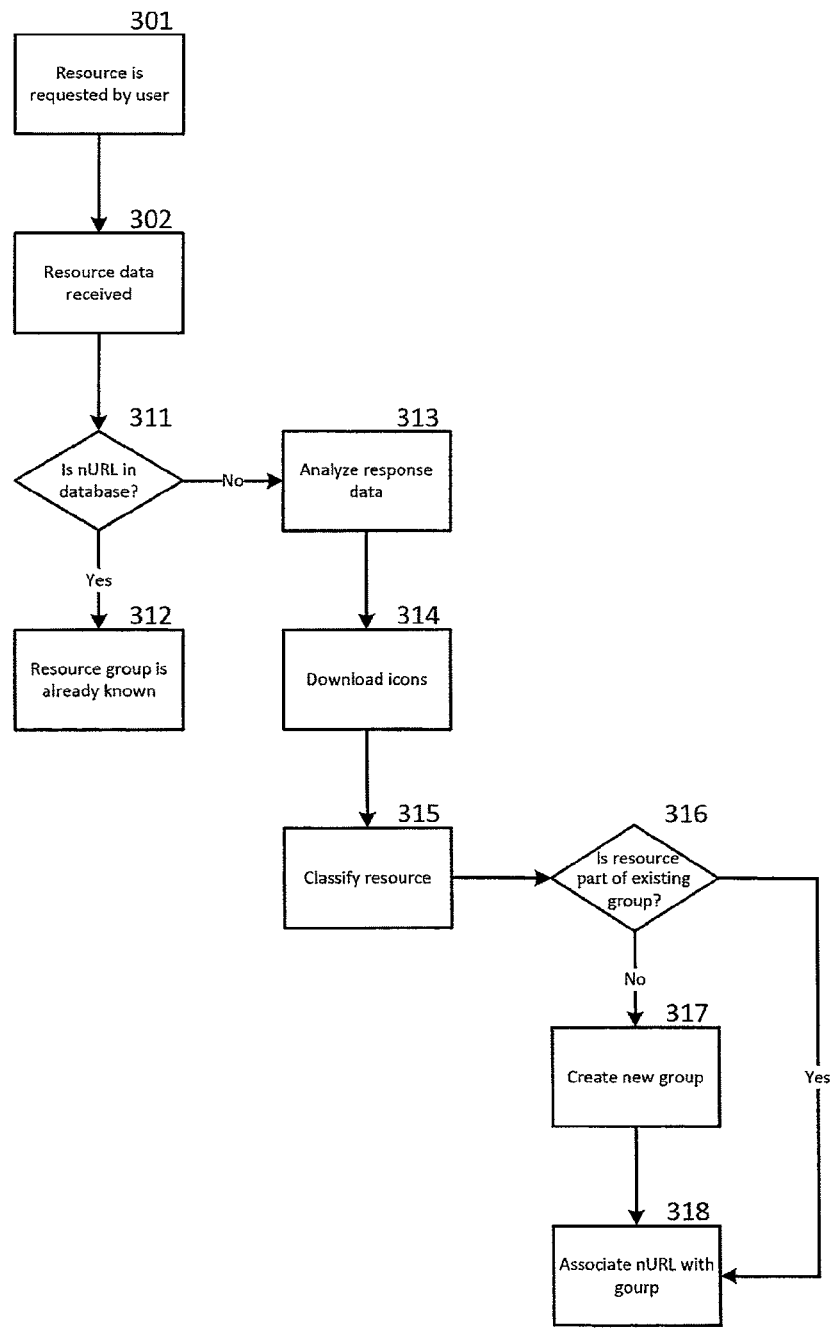
FIGS. 3b and 4 are flow charts illustrating a process for classifying webpages as belonging to distinct groups.

Reference is now made to FIG. 3, which illustrates in a flow chart a method consistent with the principles of the invention. The drawing includes two parts, where the first part, FIG. 3a, illustrates the window handling, and the second part, FIG. 3b, illustrates the classification process.

The method starts in a first step 301 in which a resource accessible over the Internet 203 is requested by a user, for example by tapping on a hyperlink displayed in a browser window 206, by tapping on an icon associated with a group of resources, for example as displayed in speed dial view 206, or by entering a complete URL identifying the resource in a URL field 204. Unless the resource has already been loaded and stored on the device as an active document 212, it will be requested from the network by the document manager 210 using the network module 215 and in accordance with its URL. It will be assumed that this is not the first resource that is requested, and that active resources are already stored in memory 212. Collectively these resources can be thought of as a plurality of resources that are accessible by the web browser.

After data is received in step 302, a determination is made in steps 303, 304 and 305 regarding how the request was made. If the request was the result of a tap on a hyperlink which is displayed (e.g. in a web view 206) as part of an already loaded resource (e.g. a web page), as shown in step 303, the process simply proceeds to load and display the resource in the active browser window in step 309, and in this case the active browser window is the browser window within which the request was made. If, on the other hand, it is determined that the user tapped on an icon representative of a group of resources (e.g. in a speed dial view 205), as shown in branch point 304, the process moves to step 306 where it is determined whether this group of resources is associated with an existing window. If this is the case, the existing window is opened and made active in step 307, and the resource is loaded in the active window in step 309. If, in step 306, it was determined that the group of resources represented by the selected icon is not currently associated with any open window, a new window is created in step 308 and this new window is opened and made active. Similarly, if it is determined in step 305 that the user entered a complete URL, the process proceeds to step 308 where a new window is created, opened and made active. After step 308, the process proceeds to step 309 where the resource is loaded in the active window.

It should be noted that in accordance with some embodiments of the invention, the request that is made in step 301 may either identify a specific resource explicitly, for example by tapping or clicking on a hyperlink or by entering a complete URL, or it may only identify a group of resources, for example by tapping or clicking on an icon representing such a group. When the former is the case, the browser may proceed to request the identified resource. When the latter is the case, the browser may determine which resource from the group of resources, for example by identifying a most relevant resource from the group, based on a previously stored state for the group of resources, or in accordance with other predefined rules. This will be discussed in further detail below.

It should also be noted at FIG. 3a illustrates three methods for entering a request by a user, including link selection, icon selection, and URL entry. In some embodiments additional methods may be provided. For example, it may be possible to enter a URL using a search functionality which is presented outside any active browser window, corresponding to the alternative illustrated in step 305, and in addition it may be possible to enter a URL in an address field associated with the active browser window. The latter case may then be handled differently from the former, for example in the same way as when a user selects a hyperlink, as shown in step 303.

Reference is now made to FIG. 3b, which illustrates a classification process which may run in parallel with the process of loading and displaying, as illustrated in FIG. 3a. This process starts when a user requests a resource in step 301, following which resource data is received in step 302. These two steps are the same as those illustrated with the same reference numbers in FIG. 3a. In a next step 311 it is determined whether the normalized URL of the resource that is being loaded is present in the database 214. If this is the case the resource group is already known 312 and no further classification takes place. If, however, it is determined in step 311 that the normalized URL is not present in the database 214, the process moves on to step 313, where response data is analyzed.

As data arrives for the URL, it is parsed and information is extracted. In particular document title and names, icon URLs, types and sizes may be extracted and analyzed.

In a next step 314 all icons are loaded. Among the icons that may be loaded are all icons referenced by the page or resource, icons which are found on the root of the domain. Icons may be cached, which makes it unnecessary to download the same icon repeatedly.

When all icons have loaded, the process moves on to step 315 where the resource is classified based on the data acquired in the previous steps. If the result of this classification is that the resource belongs to a group of resources that is already defined and present in the database 214, the process may proceed to step 318 where the normalized URL of the recently loaded resource is added to the database and associated with the existing group. If, on the other hand, the resource is not part of an existing group, a new group is created and added to the database in step 317 and the normalized URL of the resource is added to this group.

Figure 4:
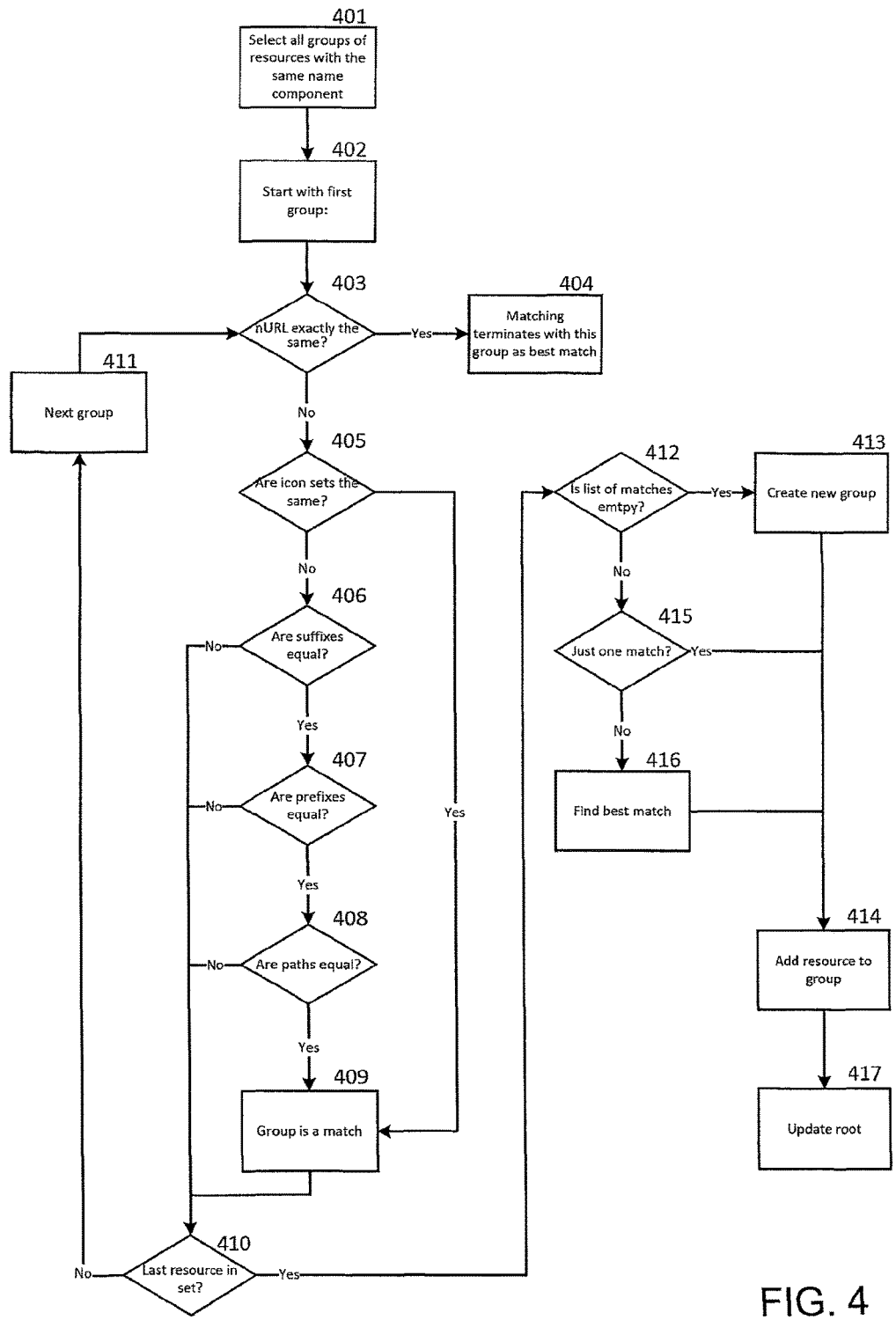

Reference is now made to FIG. 4 which presents the classification performed in step 315 in further detail. In this step, resources, or webpages, are classified as belonging to distinct groups that can later be presented as applications or web applications. A website can be classified based on different types of concepts. For instance, websites representing an application (e.g., gmail), a brand (e.g., nike.com), or an information channel (myblog.blogger.com) may classified into a respective group. Resources may also be grouped together based on other criteria, for example for being hardware or peripherals, as already mentioned above. According to this aspect of the invention, all such groups may be thought of as applications. For this reason, the process of grouping resources may also be referred to as application detection, or simply app detection.

Each website typically consists of many documents. The present invention, in a third aspect, automatically categorizes to which web application, application or web site a particular document belongs. To do this, the browser maintains a list of websites in a database 214. In the database 214, each website may be associated with properties such as meta information such as logo and title, position of the website in the user interface when presented as an icon in a grid, a list of rules used to classify which documents belong to the website, and a list of document which belong to the website.

In the database 214, documents (or resources) may typically be identified by URLs. The URLs may be normalized heavily in order to reduce the number of application detections that are necessary. A typical URL may look like this:

http://www.example.com/foo/bar/more/foo?q-1&bar=zoom#19917045987

The URL can be split into the following components:
Scheme: http
Host: www.example.com
  Prefix: www
  Domain: example.com
    Name component: example
    Suffix: corn
Path: /foo/bar/more/foo
Query: ?q=1&bar=zoom
Fragment: #19917045987

After discarding everything except the host and path component, the normalized URL becomes:
www.example.com/foo/bar/more/foo This means that URLs that vary only in scheme (e.g. http), query or fragment may be regarded as the same URL as far as application detection is concerned.

In a first step of the classification process 401 all resources in the database with the same name component as the present page, are selected. The present resource is then compared with each group of the selected groups of resources, starting with the first group in step 402. First, in step 403, it is determined whether the normalized URL of the present resource and the normalized URL of the root node of the selected group of resources are compared. If they are exactly the same, no further processing is necessary, the appropriate resource group is found and the process moves to step 404. It should be noted that in order to progress to this step it will have been determined in step 311 that the normalized URL is not in the database. However, it is possible to compute an equivalent of a normalized URL on demand for certain pre-defined resource groups that have not actually been visited (and thus stored in the database) but that nevertheless exist as defined groups (for example as preinstalled icons in a speed dial interface or a bookmark list). In step 404 the resource is added to this group, or a relevant group is created and the resource is added, according to circumstances. This step is a way of handling that situation, but this may not be necessary in some embodiments.

If the normalized URL of the resource does not match that of the root node, processing moves on to step 405 where it is determined whether the icons sets of the current resource and the potential matching group are equal. Icon matching is discussed in further detail below, but it should be noted that different standards can be applied in order to determine that the icon sets match. For example, it may be required that the icon sets are actually loaded, and that they are not empty. On the other hand, in some embodiments it may be sufficient that the sets are "sufficiently similar", and not identical. Exactly what it takes to be "sufficiently similar" may in some embodiments be determined or configured by a designer or even by a user.

If the icons sets do match, the current resource and the group are a match, and the process progresses to step 409. If not, the process moves on to compare suffixes in step 406. If suffixes do not match, we do not have a match, and the process moves to step 4010 where it is determined if the group just considered was the last group in the set of potential matches. If not, the next group is selected in step 411 and the process returns to step 403. If the suffixes are determined to be equal in step 406 the process moves on to compare prefixes in step 407 in the same manner, and finally to compare paths in step 408. If suffixes, prefixes and paths are determined to be equal, we have a match and the process moves on to step 409. If either test fails, the process moves directly to step 410 as described above.

After step 409, the process moves on to step 410 as described above. When it is eventually determined in step 410 that all potential matching resource groups (or applications) have been tested, the process moves on to step 412 where it is determined whether the list of matches is empty. If it is the current resource does not match any existing group, and a new group is created in step 413. Step 413 corresponds to step 317 in FIG. 3b. Finally, in step 414 the current resource is added to, in this case, the newly created group. Step 414 corresponds to step 318 in FIG. 3b.

If the list of matches is not empty, the process moves on to step 415 where it is determined if there was only one matching group. If so, the process moves to step 414 and the current resource is added to the one matching group.

If it is determined in step 415 that there are more than one matches the process moves on to step 416, where the best match is determined.

According to one embodiment, the best match is determined as follows.

Matching groups may be compared two and two.
1. If the suffix of group A is equal to the suffix of the current resource, but the suffix of B is not, A is a better match than B.
2. If the prefix of A is a closer match than the prefix of B, then A is better. The prefix is a closer match if it has more consecutive prefix components in common with the current resource than the other prefix.
3. If the path of A is a closer match than the path of B, then A is better. The path is a closer match if it has more consecutive path components in common with the current resource than the other path.

After the best match has been found, the current resource is added to the best matching group in step 414.

In a final step 417 the root of the group may be updated. The root of the group is the URL the user is taken to when the group, or application, is opened for the first time (or after any stored state information that would take the user to a different URL has expired). Two parts of the root URL may be updated, the prefix and the path, and they are updated to the "highest seen common level". (However, in some embodiments it may be desirable to be able to update the suffix as well.)

As an example, if the user has never visited the root of a domain, but instead gone directly to an article, e.g. en.wikipedia.org/wiki/Digital_data, the root of the application will initially be en.wikipedia.org/wiki/Digital_data. If the user then goes to a different article, for example en.wikipedia.org/wiki/Information_theory, it will be detected that this URL is part of the en.wikipedia.org/wiki/Digital_data application, and a new root URL will be computed. The new path will be /wiki/ (shortened from /wiki/Digital_data), and the new prefix is en (unchanged).

The new root is therefore en.wikipedia.org/wiki/.

If the user then goes to the root of the domain, wikipedia.org, the common path with the existing path will simply be /, and the common prefix will be empty. The root will therefore be changed to wikipedia.org.

According to another aspect of the invention, a user may override the classification in order to explicitly identify a subset of the resources included in a group of resources as a separate group. This may allow a user to make a part of for example a web page which is of particular interest more readily accessible. Examples of situations where a user may find this convenient may be the sports section of an online newspaper, a currency converter on the web site of a bank, or a specific blog hosted by a blog host which would otherwise be classified based on the host and not the individual blog author.

In one embodiment, this classification does not only statically classify a specific resource (as determined, for example, by the normalized URL) as a separate application. Instead, a new rule is generated in order for the classification process to identify additional resources which should be considered part of the application that has been defined by the user, and not part of the application from which it has been separated out.

The new rule may be based on characteristics which is detected in and which differentiates the resource that has been separated from the rest of the web site and which differentiates the resource, for example the inclusion of specific header elements, graphic elements etc. The new rule may also include parts of the URL which was removed in the normalization process, such as a query part of the URL.

In some embodiments consistent with the principles of the invention, while in the first mode mentioned above (where the browser window is open and displaying a resource belonging to a particular group of resources), the web browser does not display any permanent user interface element associated with the browser itself (such as, for example, the URL field 204, the speed dial interface 205, back, forward or reload buttons, etc). Instead, in such embodiments, only information obtained from, or representative of a resource belonging to the active group of resources, is displayed. These embodiments serve to hand control over to the group of resources themselves, and the group of resources may be thought of as an individual application. Web authors or designers may then create web applications in which all user interface controls that are relevant to the user, when accessing the particular website, are embedded in the webpages themselves. The website, or a part of the website, will then be experienced as an application by the user, and the various webpages belonging to the web site will be experienced as different states of the application. A particular group of resources may also be created for the resources that represent hardware connected to, or accessible from, the device on which the web browser is installed. The characterizing feature causing such resources to be classified together would be that the resources represent hardware, and the group of resources would be analogous to an application for configuring hardware.

The classification of resources has already been discussed.

In response to user input the web browser may be configured to toggle between this chromeless browser window of the first mode, and one where a plurality of groups of resources are displayed in the second mode mentioned above, i.e., in the minimized form of an icon, a tab, a thumbnail or the like. The first and second modes may be exclusive in the sense that the web browser either displays only the open window in the first mode, or only a plurality of representations (e.g., in the form of a list or grid of icons) in the second mode. However, as an alternative, it is consistent with the principles of the invention to display the minimized representations either in a part of the screen not used by the open browser window, or overlaying the open browser window, when the second mode is invoked.

As such, the web browser may be configured to toggle between exclusive representations in the first and the second mode, or the web browser may alternatively be configured to display at least one resource from one group of resources in the first mode in one display window while simultaneously displaying at least one representation of a group of resources in the second mode, outside of or superimposed on the first mode display window.

The web browser, when displaying a resource from a group of resources in the first mode may be configured to toggle between a first view displaying content provided by the resource, and a second view displaying data or user interface elements related to the resource or the application. Such data or user interface elements related to the resource or the group of resources can, for example, include: security and trust information, a URL identifying the resource, a list of resources classified as belonging to the group of resources, an action to share the resource, an action to print the resource, an action to select an icon representative of the group of resources, an action to identify the resource as the default resource to display when the group of resources is opened in the first mode, and an action to remove a resource from a list of resources classified as belonging to the group of resources.

The user interface may provide different overviews of known websites in a presentation of groups of resources in the second mode. For example, when presenting recently accessed websites, the browser may provide a list including an overview of websites by access time. Access time is the last time when the user opened and interacted (clicked, typed in data, etc.) with the website. When opened, the last accessed website is selected, and the user can browse through the list to see and open websites that have been accessed earlier.

Another alternative is a "speed dial" mode, which is a view that may show all websites as tiles in a series of grids. The user can manually move a new website to "favorite websites," for instance, by dragging it from the "history list" to "favorite websites." One speed dial item may consist of a group of documents and/or websites. When clicked on the item, the group is shown in a grid. The group may close by clicking outside the grid.

The web browser, when displaying a plurality of groups of resources in the second mode, may be configured to, in response to user input, switch between two or more of the following types of views: a display of a plurality of groups of resources that have recently been accessed; a display of a plurality of groups of resources that represent user favorites; and a display of a plurality of groups of resources that represent all applications represented in memory.

The presentation of resources (applications, websites) in a second mode may include the provision of a set of methods (or processes) that can be invoked on any group of resources through user input applied to the graphical representation of resources in the second mode. Specifically, each method can be invoked by dragging and dropping the graphical representation (for example an icon) from its current position in the display and to a representation or area of the display associated with the method. Such a representation or area may include a browser window in order to load and display the resource, or a position in a list or a grid representing bookmarks or a short list of pre-selected resources, for example a "speed dial" type of functionality in an otherwise empty browser window.

Other possibilities include dragging and dropping an icon to a stack of icons representing a shortlist of groups of resources, for example a list of recently visited web sites, and a search method for performing a web search based on a text string associated with the group of resources, for example the name of the resource. Another method that can be similarly invoked is the deletion of the group of resources from the database 214, the shortlist of recently accessed web sites, a history list, or any other database or list wherein the group of resources (web site, application) is currently entered and which is associated with its current representation on the display. This may for example mean that if the icon is selected from a representation of recently accessed web sites and dragged to a representation of a trash can, a method is invoked to delete the entry of that web site from the list of recently accessed web sites, but not necessarily from the database of known web sites or applications 214. Of course, the list of recently accessed web sites may be implemented as a list in the database 214, or as information associated with or part of entries in this database. It does not have to be a separate list or a list that exists outside the database 214.

In some embodiments of the invention, a rule is enforced to ensure that an icon representing a group of resources in the second mode is never displayed more than once in a give view. In particular, this rule may ensure that an icon can only be represented in one context, which is stored in the database 214. This context may, for example, include speed dial, recently visited sites, trash, and search.

According to an aspect of the invention, the presentation of a group of resources in a second mode includes displaying multiple groups of resources (multiple web sites, web applications and/or applications) as a stack of graphical representations, for example as a stack of icons. Upon receiving user input representative of dragging the topmost graphical representation in a first direction the view changes to a third mode where the graphical representations are displayed side by side. Upon receiving user input representative of dragging the topmost graphical representation in a second direction, for example dragging the topmost graphical representation into a predetermined area of the display such as a browser window, a document in the group of resources represented by that graphical representation (icon) becomes the current document and is displayed in the browser window. Similarly, if any of the graphical representations displayed side by side in the third mode is selected, for example by clicking, tapping or dragging into a browser window area, a document in the group represented by the selected graphical representation becomes active and is displayed in the browser window.

The group of resources represented in the stack may, for example, be selected from a list of recently accessed websites. Alternatively, the stack may only contain representations of websites that have been actively minimized by a user, and not websites that have simply been browsed past. The manipulation of the stack may involve user invokable methods as described above.

Figure 6A:
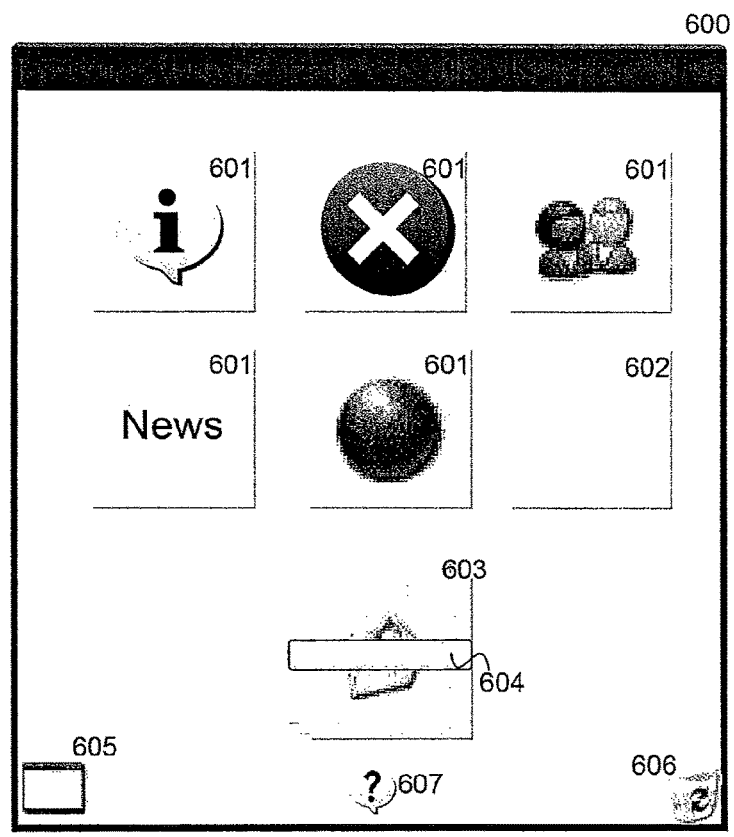
FIGS. 6a and 6b illustrate a user interface illustrating various aspects of the present invention.
Figure 6B:
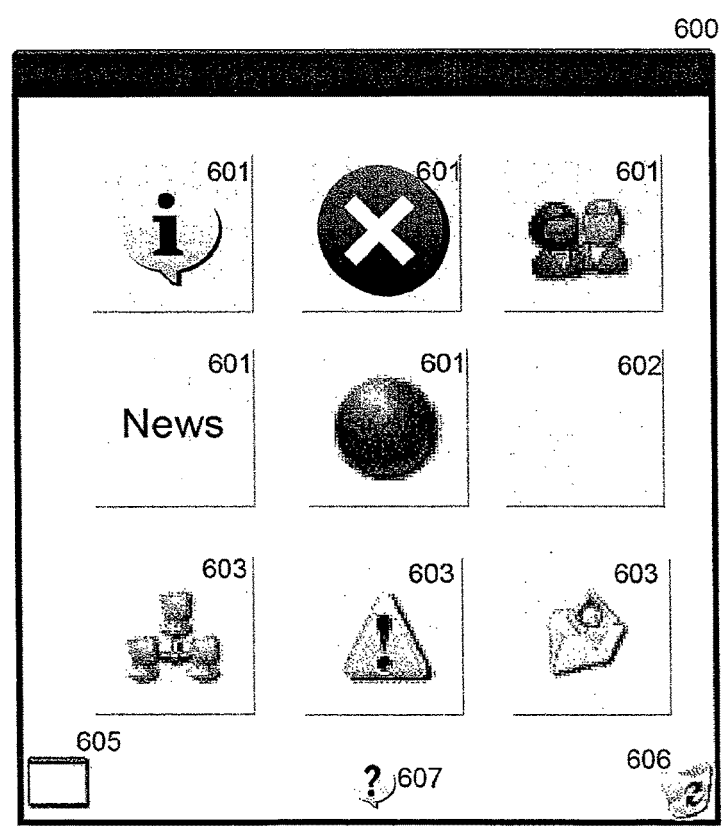

Reference is made to FIG. 6, which illustrates the above aspects in an exemplary user interface. In FIG. 6a a chromeless browser window displays a number of icons or tiles in a second mode, i.e. as representations of groups of resources such as websites or web applications. The icons 601 are located in predetermined positions in a grid pattern. For convenience they are given the same reference number, and their groups they represent are not essential to this description. A final position 602 is vacant and does not currently represent any website or web application.

Also shown is a representation of multiple groups of resources in the form of a stack of icons 603 which is shown as being held by a rubber band 604. Finally a symbol 605 represents a method of invoking an open browser window (capable of displaying resources in a first mode), a method of deleting or removing resources 606, and a search method 607.

In accordance with the principles of the invention, tapping on one of the icons 601 may open a browser window and display an associated resource. Whether a new browser window is created or an existing window is opened may be determined in accordance with the description given above with reference to FIG. 3. Similarly, tapping on the "stack" of icons 603 may open a browser window and load the resource represented by the topmost icon in the stack.

The stack may also be manipulated by dragging and dropping. Dragging in a first direction, e.g. up towards the speed dial area or down towards the method icons, will move the topmost icon. If it is dropped on the vacant position in the speed dial grid 602, the represented group may be positioned here, and removed from the stack. Dropping it on the window symbol 605 may, similarly to tapping on the stack, open a browser window and load the resource. Dropping it on the delete icon 606 may invoke a method which removes the icon from the stack. And finally dropping it on the search icon may invoke a search function and enter the root URL, or a saved state URL, of the resource in a search input field. Searching will be described further below.

Similarly, dragging and dropping one of the icons 601 from the speed dial area to one of the method icons 605, 606, 607 will invoke the respective methods described above, and dragging and dropping an icon 601 on the stack 603 will remove it from the speed dial grid and place it in the stack.

If the stack is dragged in a second direction, e.g. sideways, the icons in the stack may spread out so they are all revealed, as illustrated in FIG. 3b. The rubber band 604 "breaks" and is no longer shown, and the (in this example) three icons 603 that were stacked are now shown side by side. The same functionality is now available: they can each be tapped (or clicked), dragged and dropped.

The representation of web sites, applications or other groups of resources as icons (or tile or some other equivalent representation) when they are in a minimized second mode is utilized in a further aspect of the invention, whereby a search interface and interaction with search functionality is provided.

Figure 7:
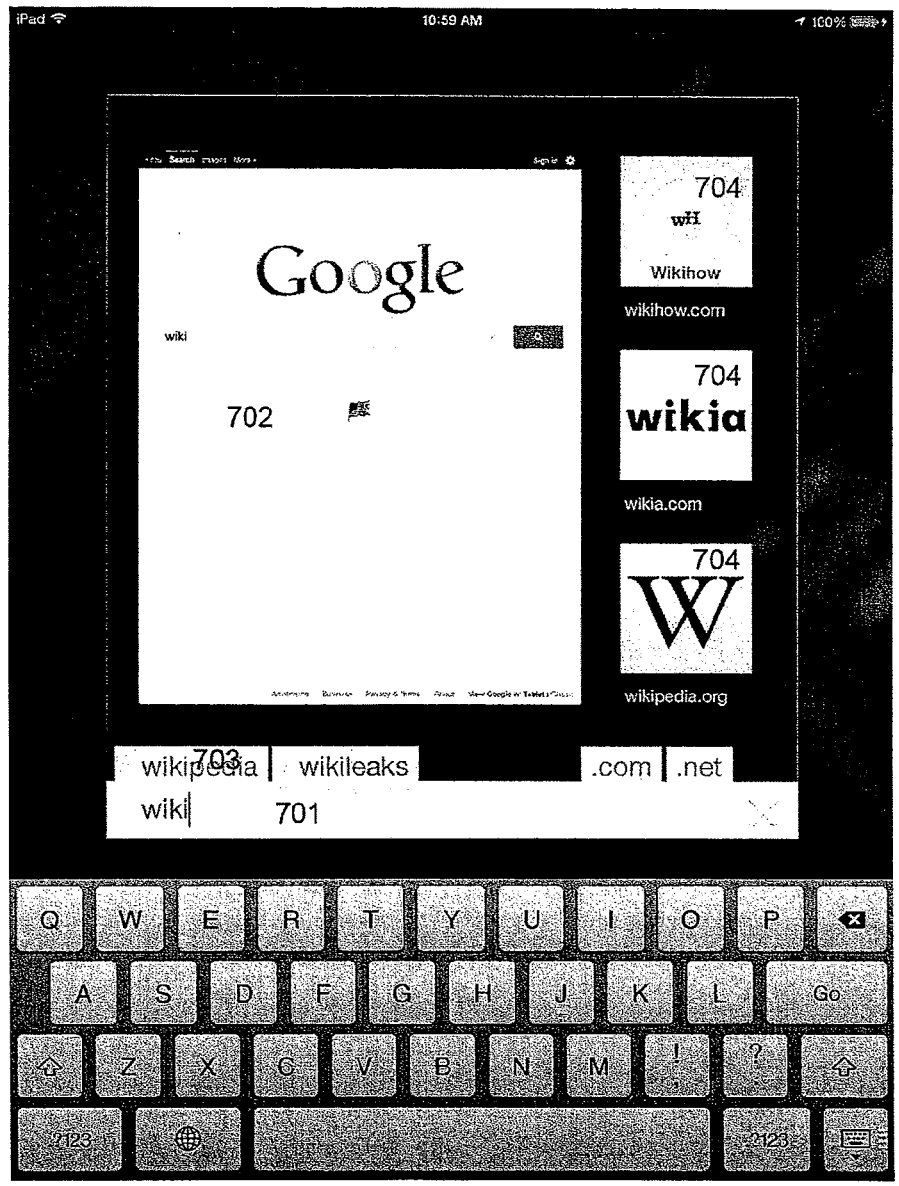
FIG. 7 is a user interface illustrating a search interface according to the invention.

Reference is made to FIG. 7, which illustrates a search interface consistent with the principles of the invention. In an input field 701, which may for example be the URL field 204 illustrated in FIG. 2, a user may type a search string. For each character the user types into the search field, three different types of search results are updated.

The search engine results 702 are presented in (in this case) the top left part of the screen, search term suggestions 703 are presented (in this case) directly above the search field 701, and website suggestions 704 are presented (in this case) to the right of the search engine. A different layout of the user interfaces may, of course, be contemplated.

The website suggestions 704 represent groups of resources, as described above. The web site suggestions resulting from a search do not, however, necessarily link to the root URL of a group, although this would be the most typical result. In some cases, the search may, however, return other resources in a group, for example a specific article on a web site rather than the root of that web site.

In the embodiment illustrated, three website suggestions are displayed. In some embodiments a maximum of one suggestion per web site may be presented, but this is not an absolute restriction, and other embodiments may allow several suggestions per web page (and more than three suggestions).

The suggestions may be ordered by relevance as determined by source (where the suggestions come from) and score.

In the search UI the suggestions may be displayed, from most to least relevant, from left to right when in a landscape mode, and from top to bottom in portrait mode.

The sources capable of delivering suggestions may include, in prioritized order:
  The search field: If the current search field input is a valid URL, this is displayed as a suggestion
  History: If a match is found in the browsing history, specifically if the current search field input matches the domain of a group's root URL, particularly among visited web applications, the hits are displayed. More specifically, matches are made against the beginning of the name component as defined above. Matching may also be made against the first subdomain (prefix), unless it is very common and therefore excluded. It may be desirable, but not strictly necessary, to exclude for example www, m, or ipad.
  Each web application may have a relevance score based on how recently and how often the web application or web site has been visited. (Relevance or importance will be further discussed below.) Suggestions taken from history may be sorted by this score.
  Finally, if the maximum number of suggestions has not been found, a server may be asked for additional suggestions. The server (not shown in any of the illustrations) may be a search engine which provides hits in terms of groups of resources similarly to that which has been described above. The search input field is sent to this server as a query, and suggested URL, web site title, icons etc. are received in response and displayed.

Consistent with the principles of the invention, the icons representing suggestions may be used by a user to invoke methods that will load, delete, store or otherwise manipulate the group of resources (for example web site) represented by the icon. Which methods are actually invokable may depend on which elements are also displayed in the user interface. Typically at least the loading and displaying of the resource in a first mode by tapping on the icon is available.

A display of a plurality of groups of resources in the second mode may, of course, extend outside a window or viewport in the form of a scrollable list or in the form of multiple pages.

A database, such as that illustrated as 214 in FIG. 2, may be used to maintain a list of groups to which resources have been classified as belonging. Each group of resources in this list may be associated with information such as a graphics element representing an icon or a logo, a text string representing a title, an identification of characterizing features used to determine when a resource belongs to the group of resources, and/or a list of resources already classified as belonging to the application. The list of resources may be in the form of normalized URLs.

According to one embodiment of the invention which differs from the one described with reference to FIG. 3, a web browser may switch windows more actively. According to this embodiment, a web browser may receive user input representing the selection of a link inside a resource classified as belonging to a first group of resources, while such resource is presented in the first mode. If the link identifies a resource classified as belonging to a second group of resources, the web browser may then perform the following operations: change the presentation of the first group of resources from the first (i.e., open) mode to the second (i.e., minimized) mode, and then open the second group of resources in the first mode and display information representing the resource identified by said link.

If the web browser receives user input representing the selection of a group of resources that is currently minimized, the associated browser window will be opened and information representing a resource classified as belonging to the selected group will be displayed. The resource that is displayed may be chosen as a result of being a default resource for the selected application, or of being the most recent resource displayed as belonging to said selected application, or of being the most important resource belonging to said selected application as determined by an importance score calculated for each resource classified as belonging to the corresponding group.

According to an aspect of the invention, a method of representing a plurality of web browser windows in one of two modes is presented in further detail. According to this aspect, a representation of a plurality of resources that are accessible from a web browser is maintained in memory. The plurality of data resources are divided into subsets, each subset being associated with a respective browser window. These browser windows can then be presented in one of two modes: a first mode in which one of the browser windows is open and content provided by an associated resource is displayed; and a second mode in which the browser window is minimized. Further, the web browser may be configured to toggle between displaying one open browser window, and displaying a grid representing a plurality of said minimized browser windows.

According to this aspect, each subset of resources associated with a browser window may be associated through one or more common characterizing features, as described above. However, in alternative embodiments, the subset of resources may be associated through a common browser history independent from the browser history of any other browser window. Instead of the traditional tabbed browsing, a user may then toggle between viewing web content, and viewing representations of browser windows in the form of icons or thumbnails representing, for example, a most recent web page viewed in that window. Again, the icons or thumbnails may be presented as a grid, or a vertical or horizontal list.

Additional considerations associated with classification or resources or documents may be contemplated.

The classification of documents can be a dynamic, iterative process. A document could initially be classified as a part of particular application, but later the classification could change and the document could be classified as part of a different application when a new rule, or more data matching an existing rule, becomes available.

A rule for classifying websites may output a score (Boolean or scalar) based on the input of a property value. The matching can be assisted with regular expressions, hash functions and/or combinations of Boolean logic. For instance, a website titled "My Site" could have the following rules:

If the hostname of the web document contains "my.site.com" or "mysite.com," the rule returns "true."
If the hostname is "login.site.com" and the previous page is "my.site.com," the rule returns "true."
Document properties that can be used for rules include:
The URL and its properties, such as protocol, host name (including any combination of prefix, name component and/or suffix), path.
Links to and from the document. Links can be navigation elements in HTML pages such as "anchor" elements, or user invoked loads such as a java script that sends an HTTP submit/request when a user performs a certain action on the document (such as clicking a link).
Logos, site icons, or such that are specified in "icon," "shortcut icon," "apple-touch-icon," "apple-touch-icon-precomposed," "property og:image" or "itemprop image," or images containing the word "logo."
Other particular tags or text in the document, for instance, the contents of the <title> tag in <head> in HTML documents.

There may also be different types of rules for classifying documents. A first type is standard rules. For instance, if a new website is created, the following default rule may be established:

For all documents with the same domain name, the rule returns "true."

A second type of rule is server rules. The browser can query a server to return websites that match a certain document based on URL.

A third type of rule is auto-generated rules. These are rules that are automatically created based on analysis of the documents and browsing behavior. For instance, a new rule created when the browser finds links from a document from the domain "domain.com" to "domain.no" to match all documents from "domain.no" as part of the website "Domain Software."

When a document is loaded that doesn't match any website, a new application is created in the browser's database, as already described. In some embodiments, the browser may extract properties to generate a visual representation of the website. The name of a website can be extracted from "meta" elements in HTML, or using one or more regular expressions matching common used patterns for document titles, such as "document name-website name." Different names can be stored for different languages, based on the domain name extension or language specified in the HTTP response. The logo of the website can be extracted using the commonly used logo specifications mentioned above. The start page of the website, by default the shortest known path, can be chosen as the default "state" of the new application when it is opened.

A few words can be added with respect to the use of icons for classification. Web pages on the Internet are typically associated with an icon set. The icon set consists of metadata of all icons referenced in the markup of the page plus icons which may exist on the root of the host. (Such as /favicon.ico and /apple-touch-icon.png).

Metadata which may be stored for each icon includes:
The MD5 of the (encoded) image data.
The width and size.
The type of the icon. (E.g. Microsoft Tile, Apple icon, regular favicon, etc.).

During application detection, an icon set diff (a file comparison which produces the difference between two files) is computed between the icon set of the page we want to detect the app for and the icon set of a potential matching app. The contents of this diff is the number of icons that are common between the two sets, and the number of icons that are different. Icon equality can be based on the MD5 of the image data, so the same icon served on a different URL will be correctly identified as the same icon.

Figure 5:
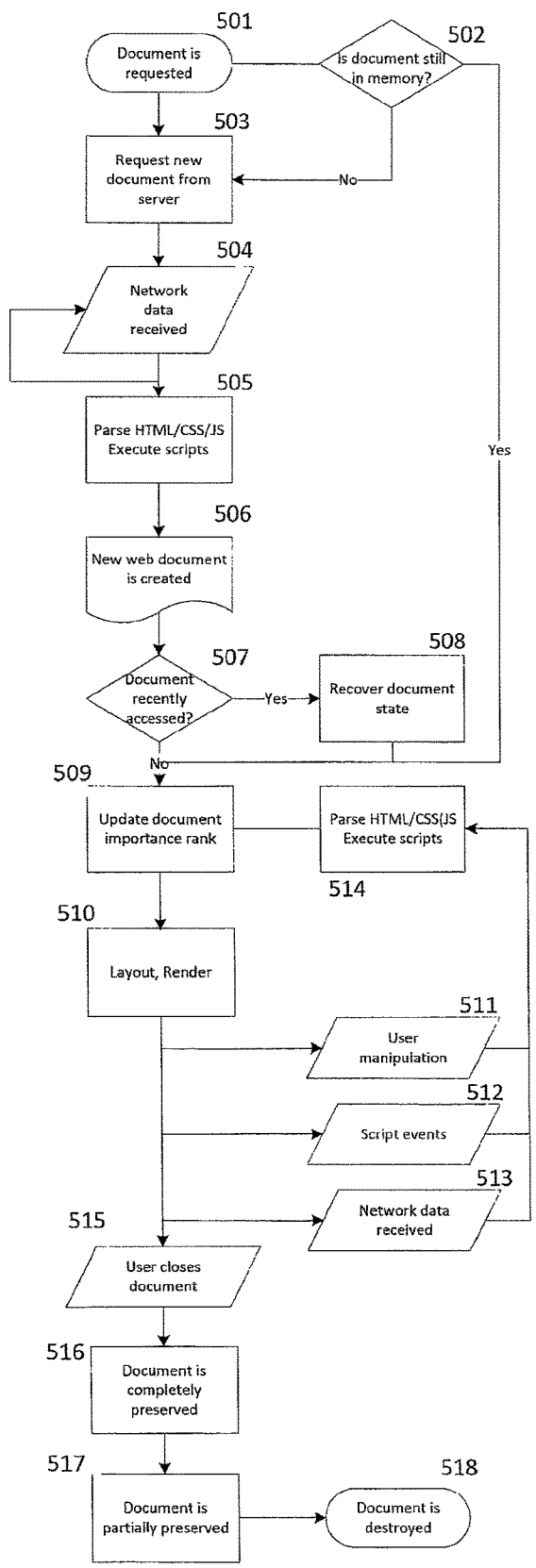
FIG. 5 is a flow chart illustrating a process for maintaining documents in memory according to an exemplary embodiment of the present invention.

Reference is now made to FIG. 5, which illustrates how documents are maintained in memory.

In a traditional tabbed browser interface, the current document in each browser tab is kept in memory for quick access and to preserve state information, and when a user navigates to a new document, the previous document is completely or partially removed from memory.

In contrast to classic browser tabs, an aspect of the present invention automates management of the lifetime of document.

A document life cycle starts with a request for a document in step 501, typically using a URL. If the document is still in memory, as determined in step 502, it can be displayed immediately and processing proceeds to step 509 where the document rank, or importance score, is updated as described in further detail below. If the document is no longer in memory, or has not been previously accessed, the process moves to step 503, where the browser performs a network request. The browser then receives data 504 from the network, and parses the information in step 505. The data, consisting of HTML, CSS, java script (ECMAscript) and related resources are loaded into memory. When the browser has received sufficient data, the browser creates a document 506 for the webpage that is being loaded.

When the document is completely or mostly loaded, and it can be determined in step 507 that it has been recently accessed, the browser recovers state information in step 508 from database 213 (FIG. 2). The document's rank, or importance score, may then be updated in step 509, and the document's layout is determined and the document is rendered in step 510.

When a document is loaded in a browser, the document, scripts and other elements may be modified due to events. These events include user interaction 511, new network data 512, and script events 513. Each time the document is changed because of such events, the browser again parses the document in step 514, and updates the "importance score" of the document in a return to step 509. Importance score can be based on a set of rules and properties of the document.

At some point, the user leaves the document in step 515, for instance, by closing the full website view or navigating to another document or website. When that happens the document can still be retained completely in memory in step 516, but as the number of documents in memory increases some documents need to be removed. This removal of documents may be performed partially from memory according to step 517, and eventually the document is completely removed in step 518.

Before a document gets destroyed, the state information is saved so as little as possible information is lost if the document is recovered at a later time.

State information in a document is information that makes the instance of the document unique, which is impossible to recreate by requesting a new copy of the document from the network. This information can be anything from the whole document to text entered in HTML form fields. Most state information is not relevant for users and can easily be disregarded. However, certain types of state information are relevant for users, and can be recovered. Examples include data in HTML form elements, such as entered text, selected buttons, and list selections. To retain the data, the browser traverses the document for form elements and registers all data, together with a unique identifier (usually the "id" or "name" property) from form elements in a database. Restoring is done by the opposite process. Other state information is the scroll position of documents that are larger than the application window, and the current URL of a document.

Using automatic document management, for each document that is visited by the user, it can be determined how important the state of the document is. This importance score is continuously updated, as described above with reference to step 509. This score of a document is stored in a database, where each document is identified by a unique URL and/or a reference in memory. The reference can, for instance, point to another document.

Since memory and CPU resources are limited, the browser may need to remove old documents from memory when new documents are loaded and stored in memory. This process starts with a notification that a certain threshold for resource usage (CPU/memory) has been surpassed. This notification can come from the OS or from the browser itself. The browser will identify the document with the lowest importance score, retain the state information, and remove the document from memory. If multiple documents are identified with the same lowest score, then the oldest document may be removed. This process can be repeated when, and as long as, the resource usage needs to be decreased.

When the browser closes all documents will be removed from memory, but retained state information will be stored in a database.

Certain documents may specify, using HTTP directives, that they need to be removed from memory when not displayed to the user anymore. The browser may remove these documents earlier from memory and not store or restore state information.

The importance score of a page is a scalar that indicates how important it is to preserve a document completely in memory. Whenever a document changes, the rank is updated. The score can for example be a sum of sub-scores produced by rules. Some rules may output multiples of a limited number of values (for instance zero and one), while others produce a scalar. Rules that produce a score that increases per certain event can be shaped by a mathematical function (such as square root).

In one embodiment, the rules defining the output of sub-scores include:

User Interaction score: the sub-score increases each time the user touches, clicks a pointing device, or presses a key.

Document interaction score: if a document is loaded as result of an HTML form submission, this sub-score increases. The sub-score further increases for each sequential page with form submission. Given a form submission, the sub-score increases above the user interaction sub-score for the previous page.

Encryption level score: documents with encryption may result in a higher sub-score than pages without it.

Loading score: documents that are still loading receive a higher sub-score than documents that have been loaded.

Last document score: a document that was the last documented visited on a website results in a higher sub-score than other documents from the same website.

Classification score: documents with a classification that indicate recoverable information receive a lower sub-score than documents with another classification. This classification of pages can be received from an online database. Classifications that indicate recoverable information may include newspapers, search engines, etc.

Automatic reloading score: documents that automatically reload (i.e., HTML meta refresh, java script reload calls) receive a lower sub-score than pages that don't.

Root node score: when a document is a root node, it receives a lower sub-score than when it is a leaf node. A document is identified as a root node if multiple other documents can be loaded from this document as a result of user requests.

Interactive loading score: this sub-score increases if a page sends load requests (such as HTML XHR) as a result of user interaction.

Figure 8:
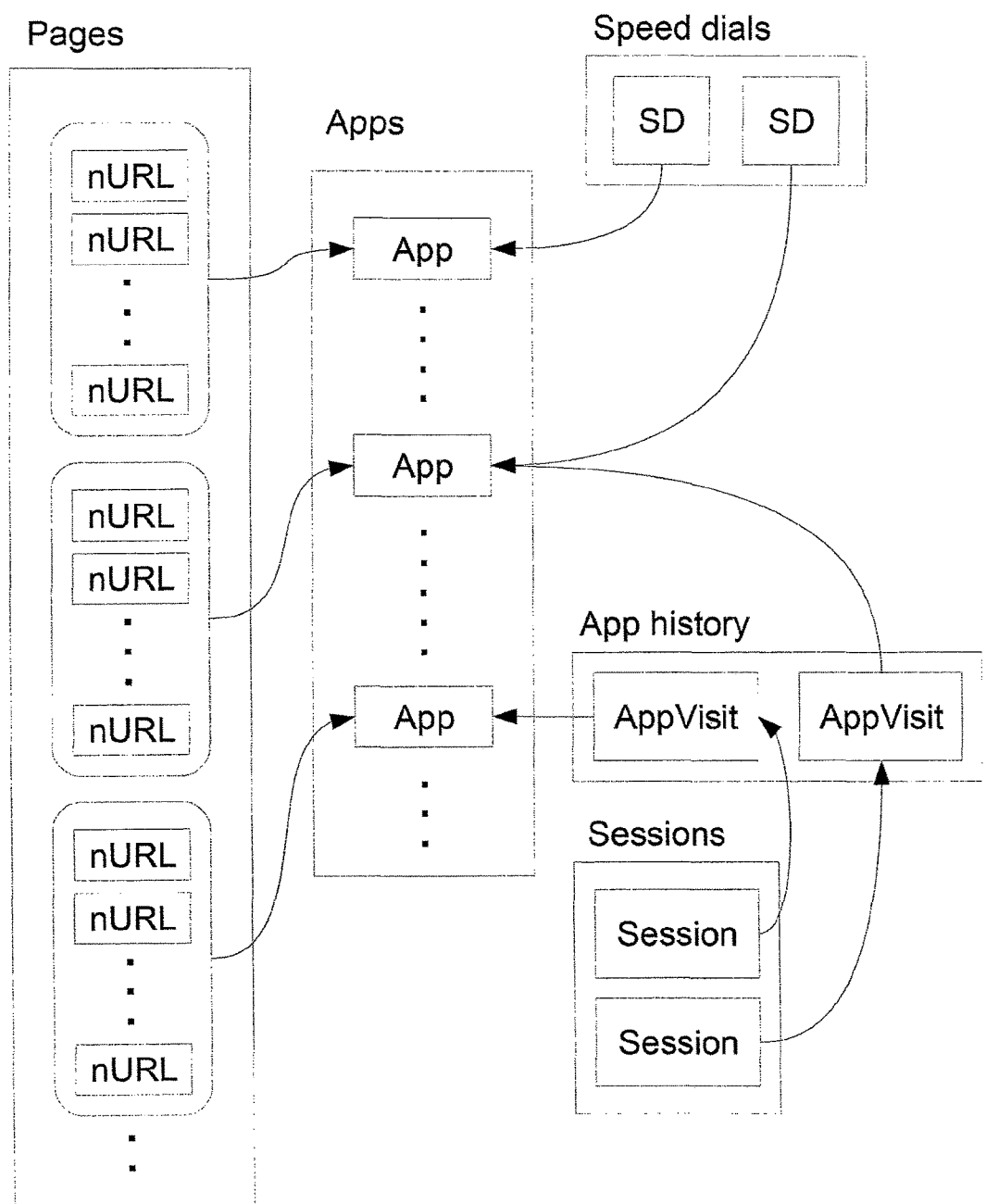
FIG. 8 is an exemplary database for storing information relating to groups of resources.

Finally, in FIG. 8 a database is shown illustrating how Apps (groups of resources) are related to Pages (resources) represented by their nURL (normalized URL), and how Speed dials in the form of speed dial icons SD reference the Apps. Also shown is how App history data and Session data is stored and reference Apps.

Several additional features may be included along with the aspects already presented. For example, while a chromeless browser window does not provide the user with any other controls than those included in the web resource itself, certain actions may still be available and invoked by one or more of the following: mouse gestures, swipes, or even by shaking or moving the device if the device includes an accelerometer. Examples include moving back and forward in browsing history using a horizontal swipe. This gesture is visualized by dragging screenshot of previous/next documents in the view. Reload may be triggered by vertical, top-down swipe, similar to how many touch screen apps refresh. Recently accessed websites can be opened by a down-top swipe.

It may also be possible to include a "backside view" of a website to alter settings and behavior of the website. According to one embodiment, a small button on the website icon is displayed for the current selected website in the "recently accessed websites" list. When this button is pressed, the website will flip visually and show the backside view.

The backside view may contain: security and trust information; document actions such as "share" or "print"; a possibility to select an icon for the website; a UI control to select the document to open when the website is opened; and a visual list of bookmarked documents (along with the functionality to remove them).

In some embodiments, when a page is loading, a screen shot of the page is shown with a visual overlay indicating that the page is non-interactive. Specifically, when a link is clicked thus triggering loading of a new document, a visual overlay is added on the page except for an area outlining the clicked link. This link area will show a progress indication (such as moving stripes). When the area outside the link area is clicked, the loading will stop and the previous page will be shown again.

An artificial intelligence module can be notified when a user load a website or a document in a website. Based on available information the module can programmed to predict a number of websites or documents that will be loaded or requested next with a level of confidence associated with each prediction. If the level of confidence exceeds a certain threshold, the document may then be loaded in the background (without being displayed to the user). If in the document is not part of the next prediction set it may be removed from memory again.

What is claimed is:

1. A method of presenting information in a web browser, comprising:
   receiving data from a plurality of resources that are accessible from the web browser;
   detecting one or more characterizing features that are part of said received data;
   associating a resource as belonging to a group of resources based on a classification of said one or more characterizing features;
   presenting each group of resources in one of two modes, where in a first mode a browser window is open and information representing a resource associated with the group is displayed, and in a second mode the group of resources is a minimized representation of the group; and
   in response to user input, toggling between displaying said open browser window of the first mode, and displaying a plurality of groups of resources in the second mode,
   wherein, in said second mode, each group of resources is:
      minimized to a topmost position in a stack of minimized representations of previously visited groups if said group of resources has not previously been included as one of a plurality of favorite groups of resources; and
      minimized to a position in a grid of minimized representations of favorite groups of resources if said group of resources has previously been added to said grid of favorite groups of resources, and
   wherein, in said second mode, a group of resources is added to said grid of favorite groups of resources in response to user input of dragging the minimized representation of said group of resources from the topmost position of said stack to a position in said grid.

2. The method of claim 1, wherein said second mode is one chosen from the group consisting of an icon representing the group of resources, a tab representing a hidden browser window, and a thumbnail representing information received from a resource belonging to the group of resources.

3. The method of claim 1, wherein the first mode is one where the web browser displays no permanent user interface element associated with the browser itself and only information obtained from or representative of a resource belonging to an active group of resources; and
   the web browser is configured to, in response to received user input, toggle between displaying only information from one group of resources in the first mode and displaying a representation of a plurality of groups of resources in the second mode.

4. The method of claim 3, wherein the web browser, when displaying a plurality of groups of resources in the second mode is configured to, in response to user input, switch between two or more views selected from the group consisting of a display of a plurality of groups of resources that have recently been accessed, a display of a plurality of groups of resources that represent user favorites, and a display of a plurality of groups of resources that represent all group of resources represented in memory.

5. The method of claim 4, wherein a display of a plurality of groups of resources extends outside a window or viewport in the form of a scrollable list or in the form of multiple pages.

6. The method of claim 1, wherein the web browser is configured to display at least one resource from a group of resources in the first mode in one display window, and at least one representation of a group of resources in the second mode outside of or superimposed on said display window.

7. The method of claim 1, wherein the web browser, when displaying a resource from a group of resources in the first mode is configured to toggle between a first view displaying content provided by the resource and a second view displaying data or user interface elements related to the resource or the group of resources.

8. The method of claim 7, wherein the data or user interface elements related to the resource or the group of resources is chosen from the group consisting of security and trust information, a URL identifying the resource, a list of resources classified as belonging to the group of resources, an action to share the resource, an action to print the resource, an action to select an icon representative of the group of resources, an action to identify the resource as the default resource to display when the group of resources is opened in the first mode, and an action to remove a resource from a list of resources classified as belonging to the group of resources.

9. The method of claim 1, wherein said one or more characterizing feature is at least one of meta information embedded in the received data, and a domain name component in the URL identifying the resource.

10. The method of claim 1, further comprising:
    maintaining a list of groups to which resources have been classified as belonging, wherein each group of resources in said list is associated with information selected from the group consisting of a graphics element representing an icon or a logo, a text string representing a title, an identification of characterizing features used to determine when a resource belongs to the group of resources, and a list of resources already classified as belonging to the group of resources.

11. The method of claim 1, further comprising:
    receiving user input representing a selection of a link inside a resource classified as belonging to a first group of resources while the resource from the first group of resources is presented in the first mode, said link identifying a resource classified as belonging to a second group of resources; and
    changing the presentation of said first group of resources from said first mode to said second mode, opening said second group of resources in said first mode, and displaying information representing the resource identified by said link.

12. The method of claim 1, further comprising:
    receiving user input representing a selection of a group of resources presented in the second mode; and
    changing the presentation of said group of resources from said second mode to said first mode, and displaying information representing a resource classified as belonging to said selected group of resources.

13. The method of claim 12, wherein said resource classified as belonging to said selected group of resources is selected from the group consisting of a default resource for the selected group of resources, the most recent resource displayed as belonging to said selected group of resources, and the most important resource belonging to said selected group of resources as determined by an importance score calculated for each resource classified as belonging to said resource.

* * * * *